(12) United States Patent
Pillai et al.

(10) Patent No.: US 11,169,957 B2
(45) Date of Patent: Nov. 9, 2021

(54) SYSTEMS AND METHODS FOR RECONFIGURABLE SYSTOLIC ARRAYS

(71) Applicant: Intel Corporation, Santa Clara, CA (US)

(72) Inventors: Kamlesh R. Pillai, Bangalore (IN); Christopher J. Hughes, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 5 days.

(21) Appl. No.: 16/371,017

(22) Filed: Mar. 31, 2019

(65) Prior Publication Data

US 2020/0311021 A1    Oct. 1, 2020

(51) Int. Cl.
*G06F 15/80* (2006.01)
*G06F 9/30* (2018.01)
*G06F 15/78* (2006.01)

(52) U.S. Cl.
CPC ........ *G06F 15/8046* (2013.01); *G06F 9/3001* (2013.01); *G06F 15/7889* (2013.01)

(58) Field of Classification Search
None
See application file for complete search history.

(56) References Cited

U.S. PATENT DOCUMENTS

| | | | | |
|---|---|---|---|---|
| 7,447,872 B2* | 11/2008 | Schroter | ................. | H04L 69/12 712/10 |
| 9,158,575 B2* | 10/2015 | Smith | ................... | G06F 9/4843 |
| 9,430,369 B2* | 8/2016 | Doerr | .................. | G06F 12/0215 |
| 10,445,638 B1* | 10/2019 | Amirineni | ............... | G06F 17/16 |
| 10,521,488 B1* | 12/2019 | Ross | .................... | G06F 15/8046 |
| 2011/0264888 A1 | 10/2011 | Dasu et al. | | |
| 2016/0267111 A1* | 9/2016 | Shoaib | ...................... | G06T 1/20 |
| 2018/0293206 A1 | 10/2018 | Harsha et al. | | |
| 2019/0042262 A1* | 2/2019 | Espig | ..................... | G06F 9/384 |
| 2020/0004553 A1* | 1/2020 | Li | ........................ | G06F 15/7889 |
| 2020/0050582 A1* | 2/2020 | Vantrease | .............. | G06N 3/063 |
| 2020/0057942 A1* | 2/2020 | Ross | ................... | G06F 15/8046 |

(Continued)

OTHER PUBLICATIONS

Extended European Search Report for EP 20155786.5 dated Oct. 13, 2020.

(Continued)

*Primary Examiner* — Corey S Faherty
(74) *Attorney, Agent, or Firm* — Fletcher Yoder, P.C,

(57) ABSTRACT

Systems and techniques are provided for hardware architecture used in parallel computing applications to improve computation efficiency. An integrated circuit system may include a data store that stores data for processing and a reconfigurable systolic array that may process the data. The reconfigurable systolic array may include a first row of processing elements (PE) that process the data according to a first function and a second row of PE that process the data according to a second function. The reconfigurable systolic array may also include a routing block coupled to the first row of PE, the second row of PE, and the data store. Further, the reconfigurable systolic array may receive data from the first row of PE, transmit the data received from the first row of PE to the second row of PE, and transmit data output by the second row of PE to the first row of PE.

20 Claims, 6 Drawing Sheets

(56) References Cited

U.S. PATENT DOCUMENTS

2020/0097442 A1* 3/2020 Jacob .................. G06F 9/30032
2020/0111003 A1* 4/2020 Ross ........................ G06N 3/08
2020/0142949 A1* 5/2020 Liao ........................ G06F 7/523

OTHER PUBLICATIONS

Wei Jin, et al., "Mapping Multiple Algorithms into a Reconfigurable Systolic Array," Electrical and Computer Engineering, 2008, CCECE 2008, Canadian Conference on, IEEE, Piscataway, NJ, USA, May 4, 2008.

* cited by examiner

SYSTEMS AND METHODS FOR RECONFIGURABLE SYSTOLIC ARRAYS

BACKGROUND

The present disclosure relates generally to parallel computing, such as those used for deep learning artificial intelligence (AI). More particularly, the present disclosure relates to tailoring hardware architecture used in parallel computing applications to improve computation efficiency.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it may be understood that these statements are to be read in this light, and not as admissions of prior art.

Parallel computing applications are becoming increasingly valuable in a number of technical fields due to their ability to execute multiple calculations substantially simultaneously. For example, the parallel computing applications may include artificial intelligence (AI) applications that mimic intelligence using machines. In particular, the AI applications may be supported by learned parameter systems that improve performance on tasks without explicit programming by recognizing patterns and/or classifying data based on information learned from input data.

In turn, the learned parameter systems may employ machine learning techniques that use data received during a training or tuning phase to learn and/or adjust values of system parameters (e.g., weights). These parameters may be subsequently applied to data received during a use phase to determine an appropriate task response. For learned parameter systems that employ a subset of machine learning called deep learning (e.g., Deep Neural Networks), the parameters may be associated with connections between nodes (e.g., neurons) of an artificial neural network used by such systems.

As the complexity of learned parameter systems grows, the neural network architecture may also grow in complexity, resulting in a rapid increase of the number of connections between neurons and, thus, the number of calculations (e.g., application of parameters to the data) that occur. As such, the existing hardware architecture for many devices may have difficulty supporting these increasingly computationally intensive parallel computing applications.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
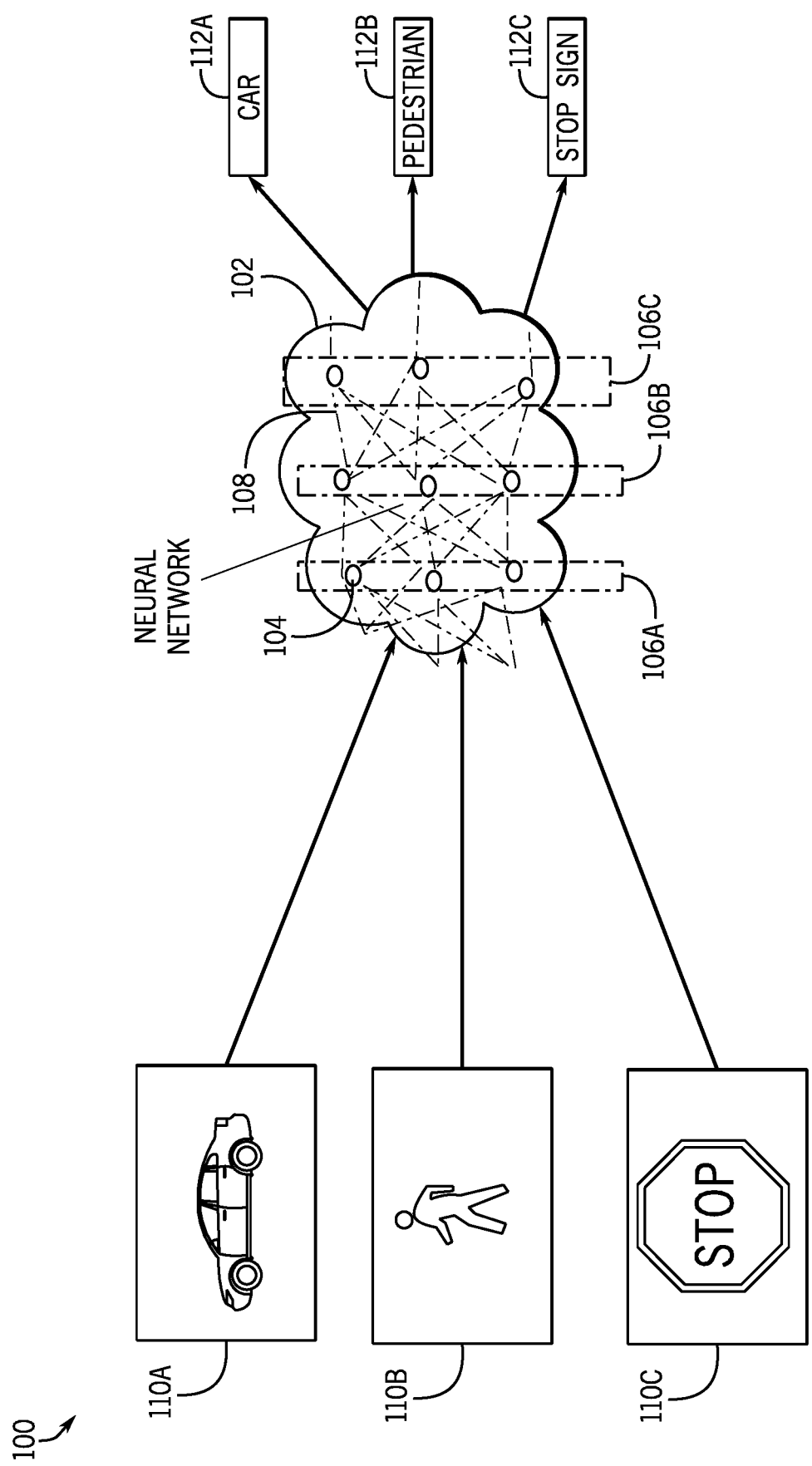
FIG. 1 is a schematic diagram of a learned parameter system, in accordance with an embodiment of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Generally, as the complexity of the learned parameter system grows, the number of calculations that may be computed by such systems may also increase. For example, for each layer of nodes, the learned parameter system may apply parameters associated with a layer of nodes to data output by the layer of nodes. That is, the learned parameter system may, in parallel, multiply weights of a layer to data output by the layer based on a connection used to transmit the data from the layer to a subsequent layer.

As such, the learned parameter system may employ computations that include convolution operations for artificial intelligence (AI) applications, which may be implemented using matrix-to-matrix operations, such as General Matrix Multiplication (GEMM). Further, the computations may also include operations that are applied to an output of the GEMM. For example, such operations may include simple linear functions (e.g., scaling by a constant factor), pooling functions (e.g., maximum pooling, minimum pooling, average pooling), and/or more complex functions (e.g., hyperbolic tangent (tan h) or sigmoid non-linear activation function).

To perform the computations, hardware architecture used to implement the learned parameter system may include one or more systolic arrays. Briefly, systolic arrays may be a network of coupled data processing units (e.g., processing elements (PE), compute nodes). Each PE may independently compute a partial result as a function of data received from PEs of upstream rows and may subsequently pass the computed data to PEs of downstream rows. The PEs may be arranged as a two-dimensional grid and may work in lock step with the PEs of the upstream rows and with the PEs of the downstream rows. In addition, the systolic array may be hardened to efficiently perform certain operations, such as fused multiply-add (FMA) (e.g., multiply and accumulate), that facilitates the parallel computations. As such, the specificity of the systolic arrays may reduce area and energy consumption, thereby improving computation performance over generic hardware architecture.

The architecture of the systolic array may be of any suitable variety. For example, one type of architecture includes a special-purpose, spatial architecture that is designed for high-performance GEMM computations for applying parameters to the data in deep learning applications. While such architecture may provide excellent efficiency for performing the matrix multiplication operations, the architecture may be inefficient for performing other operations, such as the non-linear activation function. Indeed, to perform the other operations, the architecture may feed the GEMM output to dedicated vector units that have look-up tables (LUTs) designed to perform the other operations. In other cases, the PEs of the architecture may feed their GEMM outputs to a stack, which may be expensive in terms of latency, and the other operations may be performed on the dedicated hardware. As such, this fixed function architecture may pay a relatively high cost (e.g., consumption of area) for their generality.

A second type of architecture includes a general-purpose, spatial architecture that is fully reconfigurable, such as a coarse-grained reconfigurable array (CGRA). This architecture may include a heterogeneous array of PEs that may each support a few operations in a highly efficiency manner. Software may execute resources of the architecture to perform different functions during each run by changing the flow of data through the PEs. In other words, reconfigurability arises from a PE's ability to perform more than one function. For example, during a first run, the architecture may perform the GEMM operation, and on the second run, the architecture may perform the non-linear activation function. However, because supporting the different functions involves making non-trivial changes to the systolic array, the GEMM operation and the non-linear activation function may not be performed at the same run. Further, such a fully reconfigurable architecture may consume large amounts of area and power.

Accordingly, and as further detailed below, embodiments of the present disclosure relate generally to improving computation efficiency in parallel computing applications, such as artificial intelligence. In some embodiments, the two-dimensional spatial architecture of the systolic array may be a reconfigurable systolic array that may perform more than one function at a time, per cycle, or per configuration. For example, a portion of the systolic array structure may perform a GEMM function while another portion of the systolic array structure may perform a non-linear activation function.

To do this, each row (e.g., PE row) of the systolic array may be configured to participate in either a single operation, a global operation, or a local single instruction multiple data (SIMD) operation. For example, in some embodiments, the systolic array may include one or more rows of PEs. Coupled between each row of PEs may be a routing block that appropriately routes data to PEs of a row or to another routing block, thereby skipping PE rows. Further, the systolic array may include a data store for feeding input values to one or more rows of PEs, through the routing blocks, and for storing output values from the systolic array. In addition, the flow of data to the routing blocks and from the routing blocks to the PEs may be determined by control logic that is coupled to the routing blocks, the data store, and to the PEs and that generates instructions to perform the single operation, the global operation, or the SIMD operation.

As such, the present technique provides flexibility for the systolic array to be configured to match computation resources of different functions implemented by the learned parameter system without substantially sacrificing efficiency of fixed-function systolic array architecture. Further, the present techniques may provide both SIMD and multiple instruction multiple data (MIMD) benefits. It should be appreciated that while the present disclosure is discussed in the context of artificial learning applications, any application that may benefit from use of a reconfigurable systolic array that may perform more than one function at a time has been contemplated in the disclosure.

With the foregoing in mind, FIG. 1 is a learned parameter system 100 that may employ an architecture of an artificial neural network 102, in accordance with an embodiment of the present disclosure. As previously mentioned, learned parameter systems 100 may be used in a number of technical fields for a variety of applications, such as language processing, image processing, computer vision, and object recognition. As shown, the learned parameter system 100 may be use deep learning techniques that employ the architecture of the neural network 102 to facilitate learning by the system 100. In particular, the architecture of the neural network 102 may include a number of nodes 104 (e.g., neurons) that are arranged in layers (e.g., layers 106A, 106B, and 106C, collectively 106). The nodes 104 may receive an input and compute an output based on the input data and the respective parameters. Further, arranging the nodes 104 in layers 106 may improve granularity and enable recognition of sophisticated data patterns as each layer (e.g., 106C) builds on the information communicated by a preceding layer (e.g., 106B). The nodes 104 of a layer 106 may communicate with one or more nodes 104 of another layer 106 via connections 108 formed between the nodes 104 to generate an appropriate output based on an input. Although only three layers 106A, 106B, and 106C are shown in FIG. 1, it should be understood that an actual implementation may contain many more layers, in some cases reaching hundreds of layers or more. Moreover, as the number of layers 106 and nodes 104 increases, the greater the system resources that may be used.

Briefly, the neural network 102 may first undergo training (e.g., forming and/or weighting the connections 108) prior to becoming fully functional. During the training or tuning phase, the neural network 102 may receive training inputs that are used by the learned parameter system 100 to learn and/or adjust the weight(s) for each connection 108. As an example, during the training phase, a user may provide the learned parameter system 100 with feedback on whether the system 100 correctly generated an output based on the received trained inputs. The learned parameter system 100 may adjust the parameters of certain connections 108 according to the feedback, such that the learned parameter system 100 is more likely to generate the correct output. Once the neural network 102 has been trained, the learned parameter system 100 may apply the parameters (e.g., perform GEMM) to inputs received during a use-phase to generate an appropriate output response. Different sets of parameters may be employed based on the task, such that the appropriate model is used by the learned parameter system 100. In addition, the learned parameter system 100 may perform other pre-processing operations and post-processing operations, such as applying a non-linear activation function, to, for example, determine accuracy of an output response.

To provide just one example, the learned parameter system 100 may be trained to identify objects based on image inputs. The neural network 102 may be configured with parameters determined for the task of identifying cars. During the use-phase, the neural network 102 may receive an input (e.g., 110A) at the input layer 106A. Each node 104 of the input layer 106A may receive the entire input (e.g., 110A) or a portion of the input (e.g., 110A) and, in the instances where the input layer 106A nodes 104 are passive, may duplicate the input at their output. The nodes 104 of the input layer 106A may then transmit their outputs to each of the nodes 104 of the next layer, such as a hidden layer 106B. The nodes 104 of the hidden layer 106B may be active nodes, which act as computation centers to generate an educated output based on the input. For example, a node 104 of the hidden layer 106B may amplify or dampen the significance of each of the inputs it receives from the previous layer 106A based on the weight(s) assigned to each connection 108 between this node 104 and nodes 104 of the previous layer 106A. That is, each node 104 of the hidden layer 106B may examine certain attributes (e.g., color, size, shape, motion) of the input 110A and generate a guess based on the weighting of the attributes.

The weighted inputs to the node 104 may be summed together, passed through a respective activation function (e.g., hyperbolic tangent) that determines to what extent the summation will propagate down the neural network 102, and then potentially transmitted by the nodes 104 of a following layer (e.g., output layer 106C). Each node 104 of the output layer 106C may further apply parameters to the input received by the hidden layer 106B, sum the weighted inputs, and output those results. For example, the neural network 102 may generate an output that classifies the input 110A as a car 112A. The learned parameter system 100 may additionally be configured with parameters associated with the task of identifying a pedestrian and/or a stop sign. After the appropriate configuration, the neural network 102 may receive further inputs (e.g., 110B and/or 110C, respectively), and may classify the inputs appropriately (e.g., outputs 112B and/or 112C, respectively).

It should be appreciated that, while the neural network is shown to receive a certain number of inputs 110A-110C and include a certain number of nodes 104, layers 106A, 106B, and 106C, and/or connections 108, the learned parameter system 100 may receive a greater or fewer amount of inputs 110A-110C than shown and may include any suitable number of nodes 104, layers 106A, 106B, and 106C, and/or connections 108. Further, references to training/tuning phases should be understood to include other suitable phases that adjust the parameter values to become more suitable for performing a desired function. For example, such phases may include retraining phases, fine-tuning phases, search phases, exploring phases, or the like. It should also be understood that while the present disclosure uses Deep Neural Networks as an applicable example of a learned parameter system 100, the use of the Deep Neural Network as an example here is meant to be non-limiting. Indeed, the present disclosure may apply to any suitable learned parameter system (e.g., Convolution Neural Networks, Neuromorphic systems, Spiking Networks, Deep Learning Systems, and the like).

To improve the learned parameter system's 100 ability to recognize patterns from the input data, the learned parameter system 100 may use a greater number of layers 106, such as hundreds or thousands of layers 106 with hundreds or thousands of connections 108. The number of layers 106 may allow for greater sophistication in classifying input data as each successive layer 106 builds off the feature of the preceding layers 106. Thus, as the complexity of such learned parameter systems 100 grows, the number of connections 108 and corresponding parameters may rapidly increase. Such learned parameter systems 100 may be implemented on integrated circuits.

Figure 2:
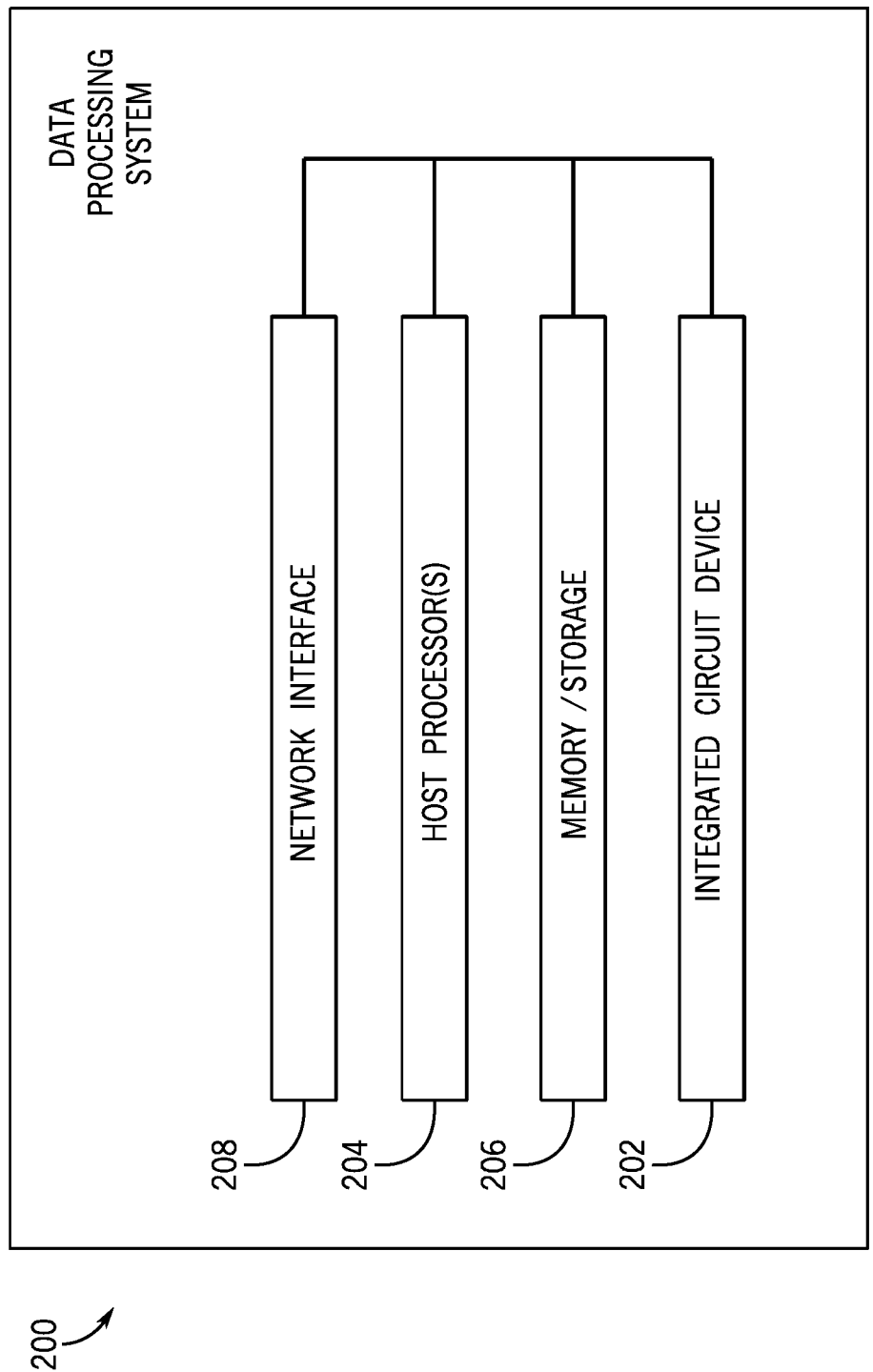
FIG. 2 is a block diagram of a data processing system that may use an integrated circuit to implement the learned parameter system of FIG. 1, in accordance with an embodiment of the present disclosure.

As such, FIG. 2 is a block diagram of a data processing system 200 including an integrated circuit device 202 that may implement the learned parameter system 100, according to an embodiment of the present disclosure. The data processing system 200 may include more or fewer components (e.g., electronic display, user interface structures, application specific integrated circuits (ASICs)) than shown. The data processing system 200 may include one or more host processors 204 may include any suitable processor, such as an INTEL® Xeon® processor or a reduced-instruction processor (e.g., a reduced instruction set computer (RISC), an Advanced RISC Machine (ARM) processor) that may manage a data processing request for the data processing system 200 (e.g., to perform machine learning, video processing, voice recognition, image recognition, data compression, database search ranking, bioinformatics, network security pattern identification, spatial navigation, or the like).

The host processor(s) 204 may communicate with the memory and/or storage circuitry 206, which may be a tangible, non-transitory, machine-readable-medium, such as random-access memory (RAM), read-only memory (ROM), one or more hard drives, flash memory, or any other suitable optical, magnetic or solid-state storage medium. The memory and/or storage circuitry 206 may hold data to be processed by the data processing system 200, such as processor-executable control software, configuration software, system parameters, configuration data, etc. The data processing system 200 may also include a network interface 208 that allows the data processing system 200 to communicate with other electronic devices. In some embodiments, the data processing system 200 may be part of a data center that processes a variety of different requests. For instance, the data processing system 200 may receive a data processing request via the network interface 208 to perform machine learning, video processing, voice recognition, image recognition, data compression, database search ranking, bioinformatics, network security pattern identification, spatial navigation, or some other specialized task.

The data processing system 200 may further include the integrated circuit device 202 that performs implementation of data processing requests. For example, the integrated circuit device 202 may implement the learned parameter system 100 once the integrated circuit device 202 has been configured to operate as a neural network 102. In particular, the integrated circuit device 202 may include hardware architecture, such as the reconfigurable systolic array described below, that may perform more than one function at a time, per cycle, or per configuration.

Further, the integrated circuit device 202 may include control logic circuitry that may transmits software instructions to the hardware architecture to control the configuration of the hardware architecture. In some embodiments, the integrated circuit device 202 may be of any suitable form. For example, architecture of the integrated circuit device 202 may be application specific integrated circuits (ASICs) that has routing circuitry that may be adjusted as discussed below or may be designed and implemented at least partly as a field-programmable gate array (FPGA) that includes a programmable logic fabric of programmable logic units. In addition, the integrated circuit device 202 may be a separate integrated circuit die or may be circuitry of a larger die that includes one or more other components.

Figure 3:
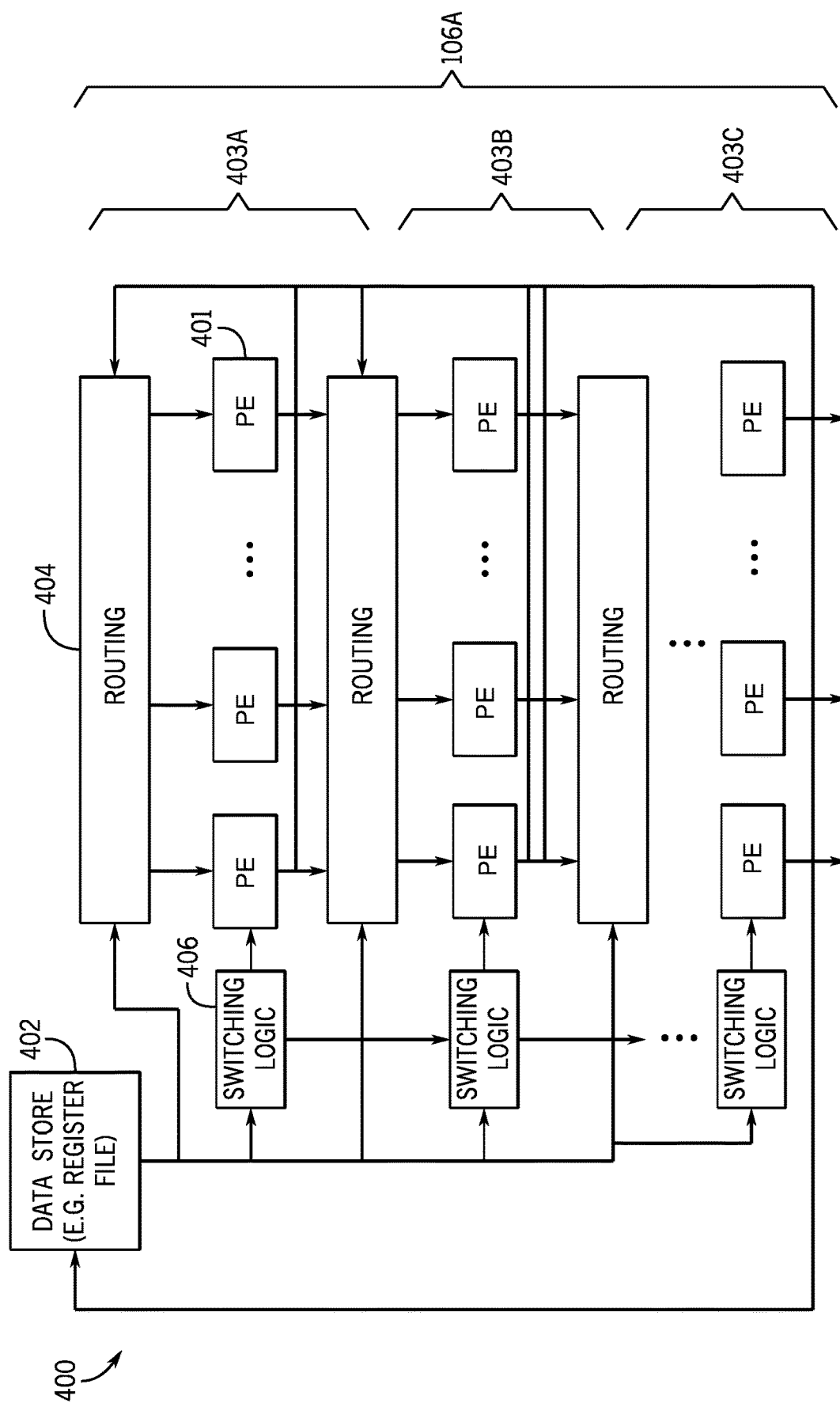
FIG. 3 is a schematic of hardware architecture that implements computations of the learned parameter system of FIG. 1, in accordance with an embodiment of the present disclosure.

In some embodiments, the integrated circuit device 202 may implement the learned parameter system 100 using a systolic array, such as a reconfigurable systolic array. FIG. 3 illustrates hardware architecture (e.g., a reconfigurable systolic array 400) that may facilitate implementing more than one function at a time to improve computation efficiency of the learned parameter system 100, in accordance with an embodiment of the present disclosure. As shown, the reconfigurable systolic array 400 may include PEs 401 (e.g., compute nodes) that are arranged as a two-dimensional grid and that each independently compute a partial result as a function of data received from, for example, PEs 401 of upstream row (e.g., 403A) and may subsequently pass the partial result to PEs 401 of downstream rows (e.g., 403C). Further, the PEs 401 may be hardened to perform a single function, such as a fused multiply-add (FMA) function, or may perform multiple different functions, such as subtraction or a bitwise logical operation. Because the reconfigurable systolic array 400 includes hardened PEs 401, the fixed-function systolic array 400 may efficiently perform certain functions while reducing area and energy consumed by the architecture.

Each PE 401 may receive input data from a data store (e.g., register file) 402 and/or from a routing block 404. The data store 402 may store large amounts of data for processing by the learned parameter system 100 and may transmit data associated with a row (e.g., 403A) to switching logic 406 coupled to the row. Based on control signals transmitted to the switching logic 406, as will be discussed below, the switching logic 406 may transmit the data to all the PEs 401 of the row (e.g., 403A) or to a portion of the PEs 401 of the row (e.g., 403A). Such connectivity between the data store 402 and the PEs 401 and/or between the data store 402 and the routing block 404, as will be discussed below, may increase flexibility in the configuration of the data flow as compared to when data flows from the data store 402 to only the top of the reconfigurable systolic array 400.

Further, the routing block 404 may control data flow through the reconfigurable systolic array 400. In particular, the routing block 404 may receive data from the data store 402 and/or from a routing block 404 associated with an upstream rows or a downstream rows (e.g., 403C). The routing block 404 may transmit certain data to parts of the reconfigurable systolic array 400, thereby controlling the flow of data through the reconfigurable systolic array 400. For instance, the routing block 404 may route data to another row (e.g., 403C) while skipping a row (e.g., 403B), may reroute data back to itself, and/or may route data to certain PEs 401 that it is coupled to. As an example, data may be rerouted back to an upstream row 403 when an entire data block cannot fit in the reconfigurable systolic array 400. Specifically, in a reconfigurable systolic array 400 that has three rows, feeding six inputs into the reconfigurable systolic array 400 may require two passes before processing is complete. As another example, a function (e.g., GEMM) may use three rows 403 of the reconfigurable systolic array 400 before completing. However, when another function (e.g., SIMD function, non-linear activation function) needs to be performed by the reconfigurable systolic array 400, the designer may devote two rows (e.g., 403A, 403B) to performing the first function while the third row (e.g., 403C) may be devoted to performing the first function and the second function in accordance with a time-multiplexing scheme. This may be possible due to the control logic circuitry used to control the routing block 404 and thus, data flow, as will be discussed in greater detail below.

Furthermore, the final row (e.g., 403C) may transmit its output back to the data store 402 for further transmission to other portions of the integrated circuit device 202. Additionally or alternatively, the PEs 401 may receive a single input. For example, when the PEs 401 are configured to perform a non-linear activation computation, the PEs 401 may receive a single output from the PEs 401 used to perform the GEMM computation. As such, in some embodiments, a pass through the entirety of the reconfigurable systolic array 400 may implement a layer (e.g., 106A) of the learned parameter system 100, including a weighting of a sum of inputs to the layer (e.g., 106A) and application of the non-linear activation function. Additionally or alternatively, a pass through the reconfigurable systolic array 500 may implement multiple layers (e.g., 106A, 106B) of the learned parameter system 100.

In some embodiments, a greater or fewer number of PEs 401, rows 403, and routing blocks 404 may be included in the reconfigurable systolic array 400 than shown. When a fewer number of routing blocks 404 are used, such that two or more rows 403 of PEs 401 are directly coupled with one another, the PEs 401 may receive data from an upstream PE 401 rather than from the routing block 404. Thus, the fewer routing blocks, the less reconfigurability is available in the reconfigurable systolic array 400.

To summarize, the reconfigurable systolic array 400 may include PEs 401 that perform multiple functionalities, such as more than FMA. Further, the connectivity of the routing blocks 404 and of the data store 402 with components of the reconfigurable systolic array 400 may enable control of data flow in a variety of directions as opposed to just downstream as with conventional systolic arrays. Thus, these features may increase flexibility in the data flow and may enable reconfiguration of the reconfigurable systolic array 400 so that more than one function is performed at one time. That is, the feature may enable the designer to use half the rows 403 to perform a function rather than the whole reconfigurable systolic array 400, avoiding re-routing of elements through the systolic array again.

Figure 4:
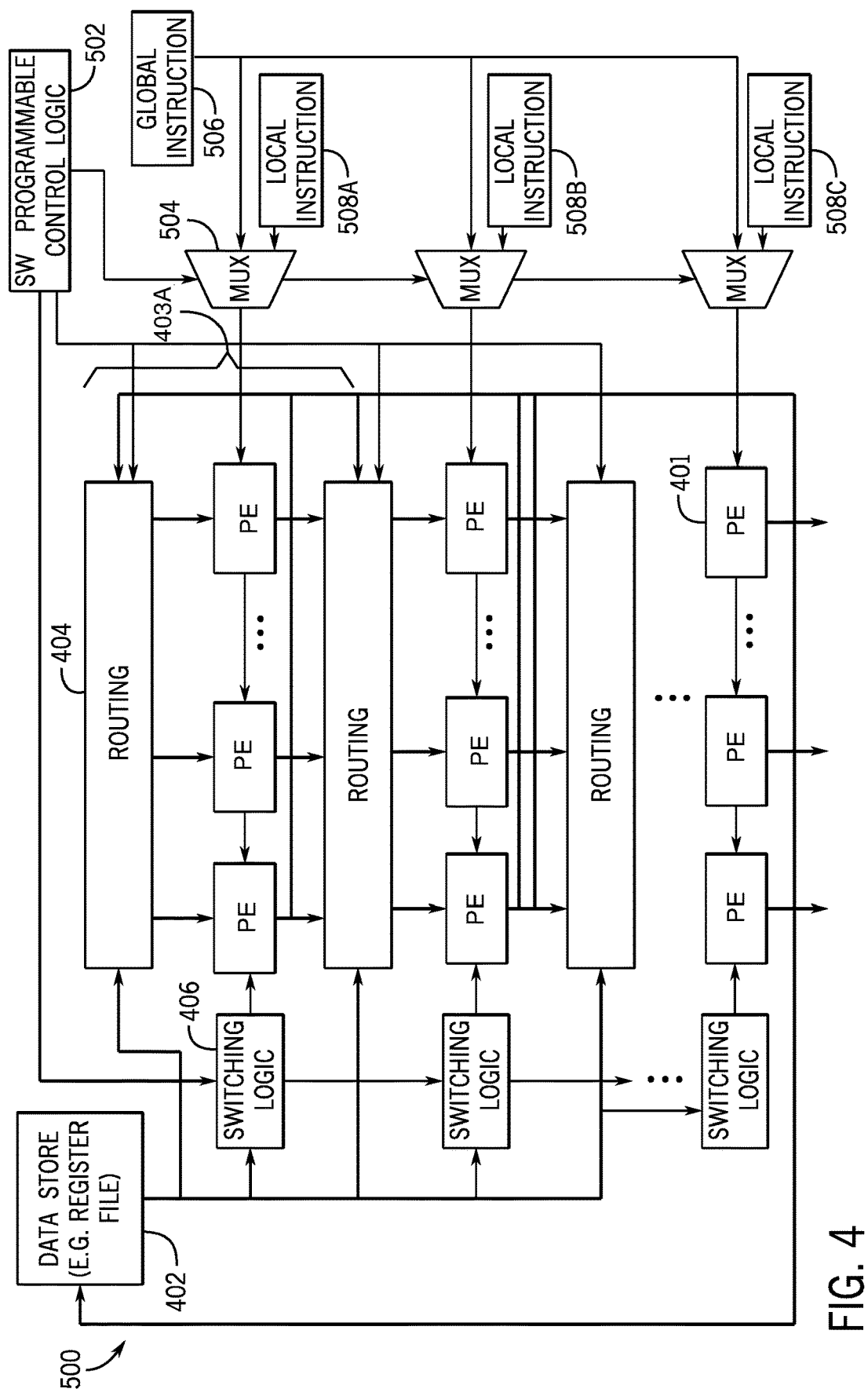
FIG. 4 is a schematic of the hardware architecture of FIG. 3 having control logic that facilitates reconfigurability of the hardware architecture for improved computation efficiency, in accordance with an embodiment of the present disclosure.

As mentioned above, control logic may improve computation efficiency of the learned parameter system 100 by controlling data flow through the reconfigurable systolic array 400 and, thus, how many functions may be performed at one time, per cycle, or per configuration. FIG. 4 illustrates a reconfigurable systolic array 500 that includes the control logic 502, in accordance with an embodiment of the present disclosure. In particular, the control logic 502 may be software-programmable control logic that controls the switching logic 406 of each row 403. For example, the control logic 502 may generate a signal to enable data associated with a row 403 to be transmitted from the data store 402 and to the PEs 401 of the row 403. In some embodiments, the control logic 502 may dynamically change the routing as data is flowing through the reconfigurable systolic array 500. Further, the control logic 502 may control the routing connectivity of the routing blocks 404 by generating a signal to indicate which rows 403 to communicatively couple to.

Further, the control logic 502 may enable the reconfigurable systolic array 400 to perform more than one function at a time without having to independently control (e.g., determine which operation to perform with which data) each PE 401, which may be costly to implement. Instead, the control logic 502 may provide row 403 independent controls by determining which operation each row 403 should perform and on which data.

As shown, each row 403 may be coupled to a multiplexer 504 that receives a global instruction (e.g., global function) 506 and/or a local instruction (e.g., local function) that will be performed by the row 403. In particular, the global instruction 506 may include operations that involve multiple rows 403 of the reconfigurable systolic array 500. The global instruction 506 may specify the function that should be performed, such as GEMM, in an interlocked manner by the multiple rows 403 without specifying the rows 403 themselves. Further, the local instruction 508 may specific the function that should be performed by a single row (e.g., 403A), such that each row 403 may perform a function independent of the others. For example, the row 403A may perform a convolution function while the row 403B may perform a non-linear activation function, as specified by the local instructions (e.g., 508A, 508B, respectively) received by each row 403.

To determine which function each row 403 should perform, the control block may evaluate pending global operations, pending pre-processing operations, and pending post-processing operations. Depending on the available data routing options in the reconfigurable systolic array 500, the control logic 502 may allocate certain rows 403 to certain operations as well as communicatively couple certain rows 403 with each other. In some embodiments, the control logic 502 may also use additional information on the routing of inputs and outputs to determine the allocation of operations to the rows 403.

For the control logic 502 to receive this information, very long instruction word (VLIW) instruction set architecture (ISA) style, software hints, and/or pure hardware hints may be used. In particular, the VLIW style may involve adding VLIW-style instructions to the ISA of the integrated circuit device 202. The VLIW-style instructions may specify the pending global operations, the pending pre-processing operations, and the pending post-processing operations. Additionally, the software hints may include inserting a hint (e.g., marker), via software, at the beginning or end of a sequence of consecutive instructions that could be mapped onto the reconfigurable systolic array 500 together.

Moreover, the pure hardware hints may be similar to the software hints, but may not be as explicit. For example, some instructions may be implicitly global. The hardware architecture may understand the implicit global nature of the instruction and may also track data dependencies. Thus, the hardware architecture may create a group of instructions that are scheduled to be transmitted to the reconfigurable systolic array 500 substantially simultaneously, set the control logic 502 for this, and process the group of instructions before moving onto the next instruction. To create the group of instructions, the hardware may create a schedule with only the next instruction and while the next instruction consumes the output of the previous instruction, the next instruction may be added to a free row of the reconfigurable systolic array 500 if the instruction is a row-wise instruction (e.g., local instruction 508). If the next instruction is a global instruction 506 and a global instruction 506 has not yet been scheduled for implementation on the reconfigurable systolic array 500 (e.g., one or more rows of the array are free), the maximum number of rows that can be used for the global instruction 506 may be determined and the global instruction 506 for implementation may be added. In some embodiments, when one or more rows of the array are not free, the global instruction 506 may be implemented using time-division multiplexing.

Figure 5:
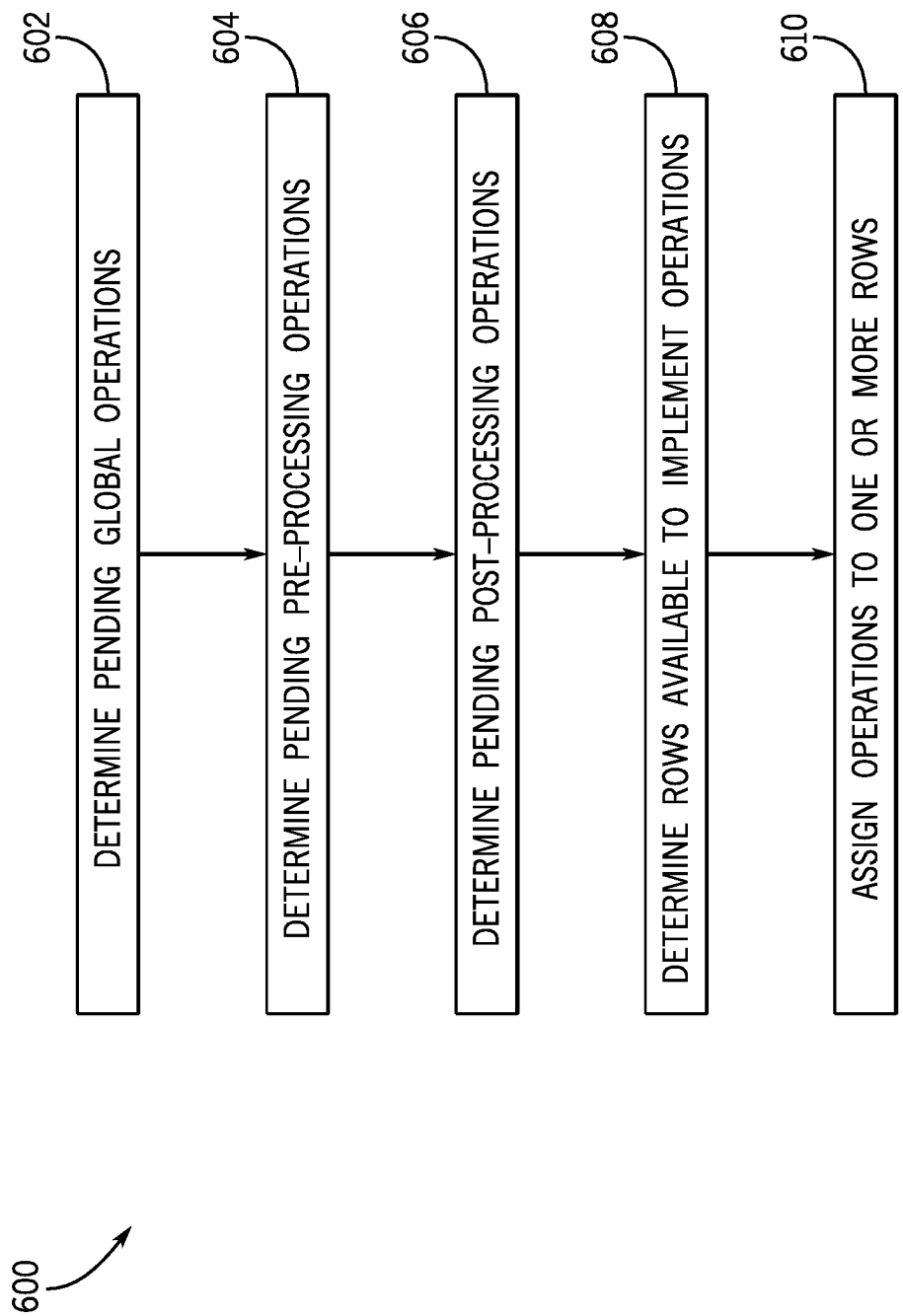
FIG. 5 is a process for determining the configuration of the reconfigurable hardware architecture of FIG. 4, in accordance with an embodiment of the present disclosure.

To summarize, a process 600 for determining the configuration of the reconfigurable systolic array 500 is shown in FIG. 5, in accordance with an embodiment of the present disclosure. While the process 600 is described in a specific sequence, it should be understood that the present disclosure contemplates that the described process 600 may be performed in different sequences than the sequence illustrated, and certain portions of the process 600 may be skipped or not performed altogether. The process 600 may be performed by any suitable device or combination of devices that may generate or receive the parameters. In some embodiments, at least some portions of the process 600 may be implemented by the host processor 204. In alternative or additional embodiments, at least some portions of the process 600 may be implemented by any other suitable components or control logic, such as the tool chain 310, the compiler 254, a processor internal to the integrated circuit device 202, and the like.

As previously discussed, using either the VLIW-style instructions, the software hints, or the pure hardware hints, the integrated circuit device 202 may determine the pending global operations and pending local operations (e.g., pre-processing operations, post-processing operations) that should be implemented by the reconfigurable systolic array 500 (blocks 602, 604, 606). The integrated circuit device 202 may also determine the number of rows 403 that may be available to implement the operations (block 608). Once the information is determined, the information may be transmitted to the control logic 502, which may assign the operations to one or more rows 403 (block 610).

Figure 6:
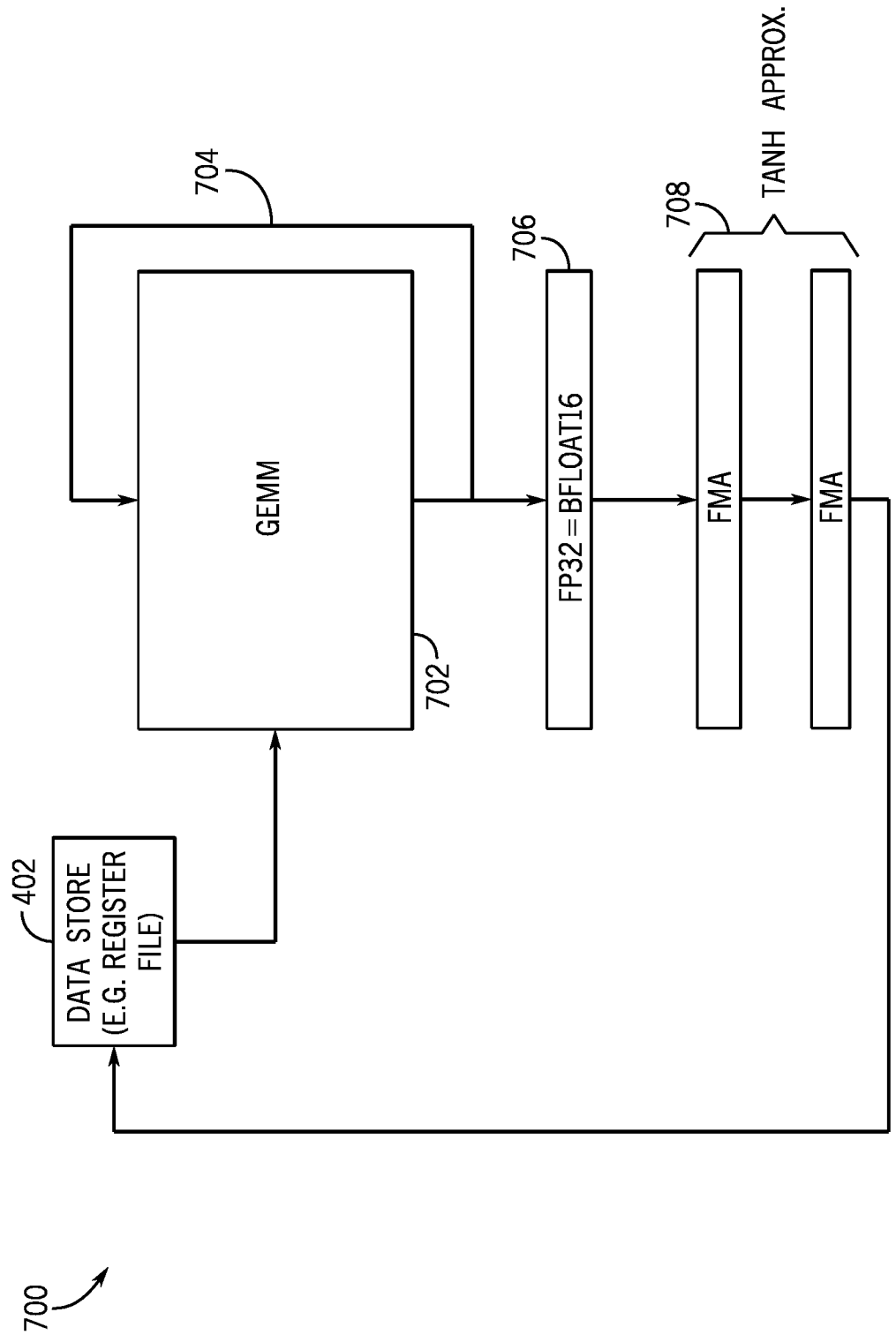
FIG. 6 is a flow diagram illustrating the reconfiguring functionality of the hardware architecture of FIG. 4, in accordance with an embodiment of the present disclosure.

An example 700 of how the reconfigurability functionality of the reconfigurable systolic array 500 may be used to implement more than one function is shown in FIG. 6, in accordance with an embodiment of the present disclosure. As shown in this example 700, a portion (e.g., one or more rows 403) of the reconfigurable systolic array 500 may be allocated to performing the GEMM 702. In some embodiments, the control logic 502 may feedback 704 the GEMM outputs into the portion allocated to performing the GEMM 702, such as when three rows are available for implementing the GEMM, but six inputs are received. In some embodiments, the GEMM may be a global instruction 506.

Once the GEMM computation is complete, the GEMM outputs may be transmitted to a row 403 that converts the data type. For example, the GEMM output may be transmitted to a row 403 that implements an operation 706 to convert the data from a 32-bit floating point type to a 16-bit BFloat16 type. Once converted, the data may be transmitted to additional rows 403 that have been configured by the control logic 502 to implement a fused multiply-add operation 708, such as a hyperbolic tangent approximation. Once processing is complete by the reconfigurable systolic array 500, the output may be transmitted back to the data store 402 for transmission to other portions of the integrated circuit device 202.

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. An integrated circuit system, comprising:
   a data store configurable to store data for processing;
   a reconfigurable systolic array configurable to process the data, wherein the reconfigurable systolic array comprises:
      a first row of processing elements configurable to process the data according to a first function;
      a second row of processing elements configurable to process the data according to a second function; and
      a routing block coupled to the first row of processing elements, to the second row of processing elements, and to the data store, wherein the routing block is configurable to:
         receive data from the first row of processing elements;
         transmit the data received from the first row of processing elements to the second row of processing elements; and
         transmit data output by the second row of processing elements to the first row of processing elements; and
   control logic circuitry configurable to control operations of the first row of processing elements, the second row of processing elements, and the routing block at least in part by:
      transmitting a first set of instructions to the first row of processing elements, wherein the first set of instructions causes the first row of processing elements to perform the first function; and
      transmitting a second set of instructions to the second row of processing elements, wherein the second set of instructions causes the second row of processing elements to perform the second function.

2. The integrated circuit system of claim 1, wherein the first function and the second function are not the same function.

3. The integrated circuit system of claim 1, wherein the first function and the second function are the same function.

4. The integrated circuit system of claim 1, wherein the routing block is configurable to receive data from the data store.

5. The integrated circuit system of claim 1, wherein the routing block is configurable to transmit the data received from the first row of processing elements to a third row of processing elements and skip over the second row of processing elements, wherein the third row of processing elements is downstream of the second row of processing elements.

6. The integrated circuit system of claim 1, wherein the second row of processing elements is configurable to process the data according to a third function using a time-division multiplexing (TDM) technique between the second function and the third function.

7. The integrated circuit system of claim 1, wherein the first set of instructions comprise local instructions, the second set of instructions comprise local instructions, and the control logic circuitry is configurable to control operations at least in part by:
   transmitting a third set of instructions to the routing block, wherein the third set of instructions comprises instructions for data flow through the reconfigurable systolic array; and
   transmitting a fourth set of instructions to the data store, wherein the fourth set of instructions comprises instructions for data flow to the routing block, to the first row of processing elements, or to the second row of processing elements, or any combination thereof.

8. The integrated circuit system of claim 1, wherein the first set of instructions comprises global instructions, and wherein the second set of instructions comprises both global instructions and local instructions, wherein the local instructions comprise instructions for processing the data according to a third function.

9. The integrated circuit system of claim 1, wherein the first row of processing elements is configurable to receive data from the data store that is associated with the first row of processing elements.

10. The integrated circuit system of claim 1, wherein the second row of processing elements is configurable to receive data from the data store that is associated with the second row of processing elements.

11. A reconfigurable systolic array configurable to perform more than one function during a time period, wherein the reconfigurable systolic array comprises:
    a first row of processing elements configurable to:
       receive a first set of instructions from control logic circuitry coupled to the reconfigurable systolic array, wherein the first set of instructions comprises a first function; and
       process data according to the first function;
    a second row of processing elements configurable to:
       receive a second set of instructions from the control logic circuitry, wherein the second set of instructions comprises a second function; and
       process data received from a routing block according to the second function; and
    the routing block coupled between the first row of processing elements and the second row of processing elements, wherein the routing block is configurable to receive a third set of instructions from the control logic circuitry, wherein the third set of instructions comprises instructions that define a routing of data by the routing block between the first row of processing elements and the second row of processing elements.

12. The reconfigurable systolic array of claim 11, wherein the first set of instructions comprises a global instruction, and wherein the second set of instructions comprises the global instruction.

13. The reconfigurable systolic array of claim 12, wherein the first function and the second function are the same function, and wherein the function comprises a general matrix multiplication operation.

14. The reconfigurable systolic array of claim 11, wherein the second set of instructions comprises a first local instruction, and wherein the second set of instructions comprises a second local instruction.

15. The reconfigurable systolic array of claim 14, wherein the first function and the second function are not the same function.

16. The reconfigurable systolic array of claim 15, wherein:
the first function comprises:
a first global matrix multiplication operation;
a first pooling function;
a first fused-multiply-add operation;
a first non-linear activation function; or
any combination thereof;
the second function comprises:
a second global matrix multiplication operation;
a second pooling function;
a second fused-multiply-add operation;
a second non-linear activation function; or
any combination thereof; and
the second function is different than the first function.

17. The reconfigurable systolic array of claim 11, wherein the second row of processing elements is configurable to:
receive a fourth set of instructions from the control logic circuitry, wherein the fourth set of instructions comprises a third function; and
process the data received from the routing block according to the third function using a time-division multiplexing technique with the second function.

18. A tangible, non-transitory computer-readable medium configured to store a program, the program comprising instructions to:
determine a number of and type of pending global functions, wherein the pending global functions are implementable on two or more rows of a reconfigurable systolic array;
determine a number of and type of pending local functions, wherein the pending local functions are implementable on a single row of the reconfigurable systolic array;
determine a number of rows of the reconfigurable systolic array that are available for implementing the pending global functions, the pending local functions, or a combination thereof; and
based on the determination of the number of rows available, assign the pending global functions, the pending local functions, or a combination thereof to one or more rows of the reconfigurable systolic array.

19. The computer-readable medium of claim 18, wherein instructions to assign the pending global functions, the pending local functions, or a combination thereof to the one or more rows of the reconfigurable systolic array comprise:
allocate the pending global functions to a first portion of the reconfigurable systolic array with a number of rows smaller than a number of operations of the pending global functions; and
allocate the pending local functions to a second portion of the reconfigurable systolic array with a number of rows equal to a number of operations of the pending local functions.

20. The integrated circuit system of claim 1, wherein the control logic circuitry comprises a multiplexer configured to select between a local instruction and a global instruction to send to the first row of processing elements, the second row of processing elements, or both.

* * * * *